United States Patent [19]
Bromley et al.

[11] Patent Number: 6,109,384
[45] Date of Patent: Aug. 29, 2000

[54] VEHICLE FRONT WHEEL SPEED CHANGE APPARATUS

[75] Inventors: Steven Bromley, Nr Doncaster; Paul David Eames, Leamington Spa; Roger Michael Weyman, Coventry, all of United Kingdom

[73] Assignee: Agco Limited, Banner Lane Coventry, United Kingdom

[21] Appl. No.: 09/038,620

[22] Filed: Mar. 11, 1998

[30] Foreign Application Priority Data

Mar. 12, 1997 [GB] United Kingdom ............... 9705056

[51] Int. Cl.⁷ ............................................. B60K 17/356
[52] U.S. Cl. ................................... 180/242; 180/305
[58] Field of Search .................... 180/365, 338, 180/233, 242, 243, 248, 244, 305, 307, 245, 246

[56] References Cited

U.S. PATENT DOCUMENTS

| | | | |
|---|---|---|---|
| 4,140,196 | 2/1979 | Brewer | 180/44 F |
| 4,574,910 | 3/1986 | Miki et al. | 180/249 |
| 4,669,559 | 6/1987 | Fukui | 180/6.24 |
| 4,696,365 | 9/1987 | Ishimori et al. | 180/233 |
| 4,723,622 | 2/1988 | Toshikuni et al. | 180/233 |
| 4,723,623 | 2/1988 | Teraoka et al. | 180/233 |
| 4,798,259 | 1/1989 | Azuma et al. | 180/233 |
| 4,824,128 | 4/1989 | Takagi et al. | 180/53.1 |
| 4,856,611 | 8/1989 | Teraoka et al. | 180/233 |
| 4,886,142 | 12/1989 | Yamaoka et al. | 180/242 |
| 4,895,217 | 1/1990 | Hueckler et al. | 180/233 |
| 5,293,956 | 3/1994 | Onishi | 180/233 |
| 5,383,531 | 1/1995 | Yoshioka et al. | 180/233 |
| 5,560,447 | 10/1996 | Ishii et al. | 180/242 |
| 5,687,808 | 11/1997 | Watanabe et al. | 180/243 |

FOREIGN PATENT DOCUMENTS

| | | |
|---|---|---|
| 2245533A | 1/1992 | United Kingdom . |
| 2246844A | 2/1992 | United Kingdom . |
| 2287922A | 10/1995 | United Kingdom . |

*Primary Examiner*—Kevin Hurley
*Attorney, Agent, or Firm*—MacMillan, Sobanski & Todd, LLC

[57] ABSTRACT

A system for accelerating the front wheels of a vehicle, eg an agricultural tractor, on turning a corner, comprises steering angle sensors (21) which, via a control unit (22) enable or disable drive to the front wheels from a hydraulic motor (11). The drive from the hydraulic motor from the front wheels is via a one-way clutch (14). The hydraulic motor (11) is powered by a pump (6) driven either directly from the vehicle engine or from the main transmission.

20 Claims, 5 Drawing Sheets

VEHICLE FRONT WHEEL SPEED CHANGE APPARATUS

BACKGROUND OF THE INVENTION

The present invention relates to the adjustment of the relative driven speed of the front and rear wheels of a front wheel steer vehicle when turning a corner. The invention has particular application in four wheel drive agricultural tractors.

It is well known that, when turning a corner, particularly a sharp corner, a vehicle's front wheels need on average to accelerate relative to the rear wheels. This is governed simply by the geometry of the paths which each of the wheels follow when a vehicle turns a corner. For example, for a 40 to 50 degree steering angle, the front wheel speed needs to increase by around 30 to 50%.

In a four wheel drive vehicle, therefore, there will be considerable wheel slip at the front wheels when turning a tight corner unless the four wheel drive is disengaged. In a four wheel drive agricultural tractor it is standard practice to disengage four wheel drive when turning a sharp corner, such as when changing direction on field headlands.

Rather than disengaging four wheel drive, it is known to provide change speed gearing for the front axle drive whereby the speed of the front axle is increased relative to the rear axle when a corner is turned. A linkage to the steering mechanism controls the ratio of this gearing automatically, so that the front axle speed is increased when the steering angle passes a certain point. Such an arrangement is known as "bi speed" gearing or a "bi speed" facility.

A problem with such arrangements is that the front wheel speed increase required to eliminate wheel slip is dependent on the exact steering angle. It is possible of course to provide multiple ratios engaging at different angles, but this obviously does not completely solve the problem. This is also a relatively expensive solution and is not generally used.

In general, therefore, bi speed facilities will have only one "bi speed ratio" and this will determine how aggressive the bi speed facility is. A high ratio will cause the vehicle to jerk on turning a sharp corner, involving considerable wheelslip and an uncomfortable ride but assisting the making of a tight turn. This type of bi speed tends to be used in agricultural tractors for use in paddy fields. A smaller ratio will make for a smoother ride and less wheel spin and this might be used for example in a tractor for use in more conventional field work. Different operators will also have preferences for different degrees of aggressiveness.

SUMMARY OF THE INVENTION

According to the present invention front wheel speed change apparatus is provided for a vehicle having a mechanical main transmission, the apparatus comprising a hydraulic motor and means for automatically engaging drive from the hydraulic motor to the front wheels when the steering angle of the front wheels exceeds a first predetermined value.

One advantage of hydraulic drive over a mechanical one is that the ratio can be infinitely variable and, provided the torque to the front wheels does not exceed that at which the wheels will slip, the speed of the wheels will be determined solely by the steering geometry with the hydraulic drive simply providing some torque. Alternatively, the hydraulic drive may be arranged to provide sufficient torque to cause wheelslip, in which case the hydraulic drive can be arranged to provide a given front wheel speed, which may or may not be variable dependent on factors such as steering angle, vehicle speed, engine speed, main transmission ratio, etc.

A further advantage of hydraulic drive is that, since the ratio can be varied easily, the drive can be engaged at a much smaller steering angle than a conventional bi-speed. A conventional bi-speed's fixed ratio will be appropriate for a given large steering angle of say 40 degrees, but will cause excessive wheel spin if drive is engaged at a smaller steering angle.

BRIEF DESCRIPTION OF THE DRAWINGS

Preferable features are set out in the dependent claims hereto. The advantages of these and other features will be apparent from the following description of two specific embodiments which is given by way of example only with reference to the accompanying drawings in which:

DETAILED DESCRIPTION OF THE PREFERRED EMBODIMENT

Figure 1:
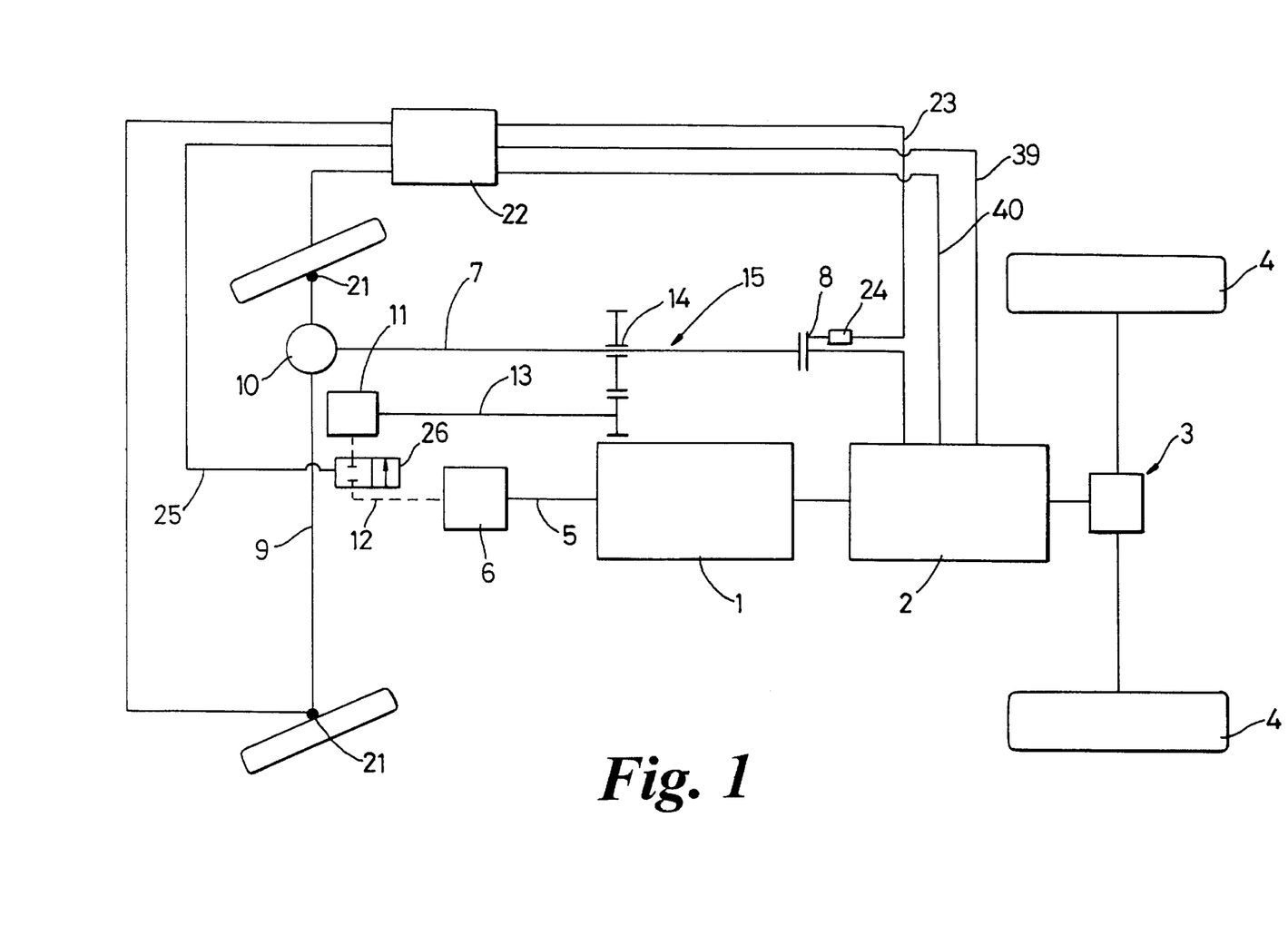
FIG. 1 is a general schematic view of the driveline of a tractor incorporating front wheel speed change apparatus in accordance with the invention (first embodiment)

The first embodiment will now be described with reference to FIGS. 1 and 2. A tractor driveline comprises an engine 1, main transmission 2, rear axle 3 and rear wheels 4. A front pto drive shaft 5 extends from the forward end of the engine. Extending forwardly from the main transmission 2 is a front axle drive shaft 7, and a four wheel drive clutch 8 is provided to control the engagement of conventional drive to the front axle 9 via a front differential 10. In practice the front axle drive shaft 7 would normally run underneath the mounting for the engine 1, but is shown here to one side for clarity.

A variable displacement hydraulic pump 6 is mounted in front of the engine 1 and is driven from the front pto shaft 5. Located on the front axle casing is a hydraulic motor 11 powered via a hydraulic line 12 from the pump 6. The output shaft 13 from the hydraulic motor 11 drives simple gearing 15 secured to the engine mounting. The output from the gearing 15 is connected to the front axle drive shaft 7 via a sprag clutch 14 forwardly of the four wheel drive clutch 8.

Located on the front wheel kingpins are electronic steering angle sensors 21 (eg simple potentiometers) connected into an electronic control unit 22. An output 23 from the control unit 22 goes to an actuator 24 controlling the four wheel drive clutch 8. A further output 25 goes to an on/off control valve 26 in the hydraulic supply 12 to the motor 11. Alternatively the steering angle may be sensed from the position of the steering cylinder and there could be a simple mechanical linkage to the four wheel drive clutch.

The control unit 22 also receives inputs from sensors in the main transmission 2 sensing the status of the main clutch (on line 40) and the main transmission ratio (on line 39).

Having thus described the basic layout of a tractor driveline incorporating front wheel speed change apparatus in accordance with the invention, the hydraulics function will be described below with reference to FIG. 2.

The pump 6 is a variable displacement hydraulic pump of well known design in which the capacity is varied by varying the angle of a swashplate 18 by means of a "spring on, pressure off" control arrangement which includes a hydraulic control cylinder 27, supplied by a hydraulic line 19. Two valves 20, 28 control the pressure in the line 19 to the control cylinder 27 as described below.

Figure 2:
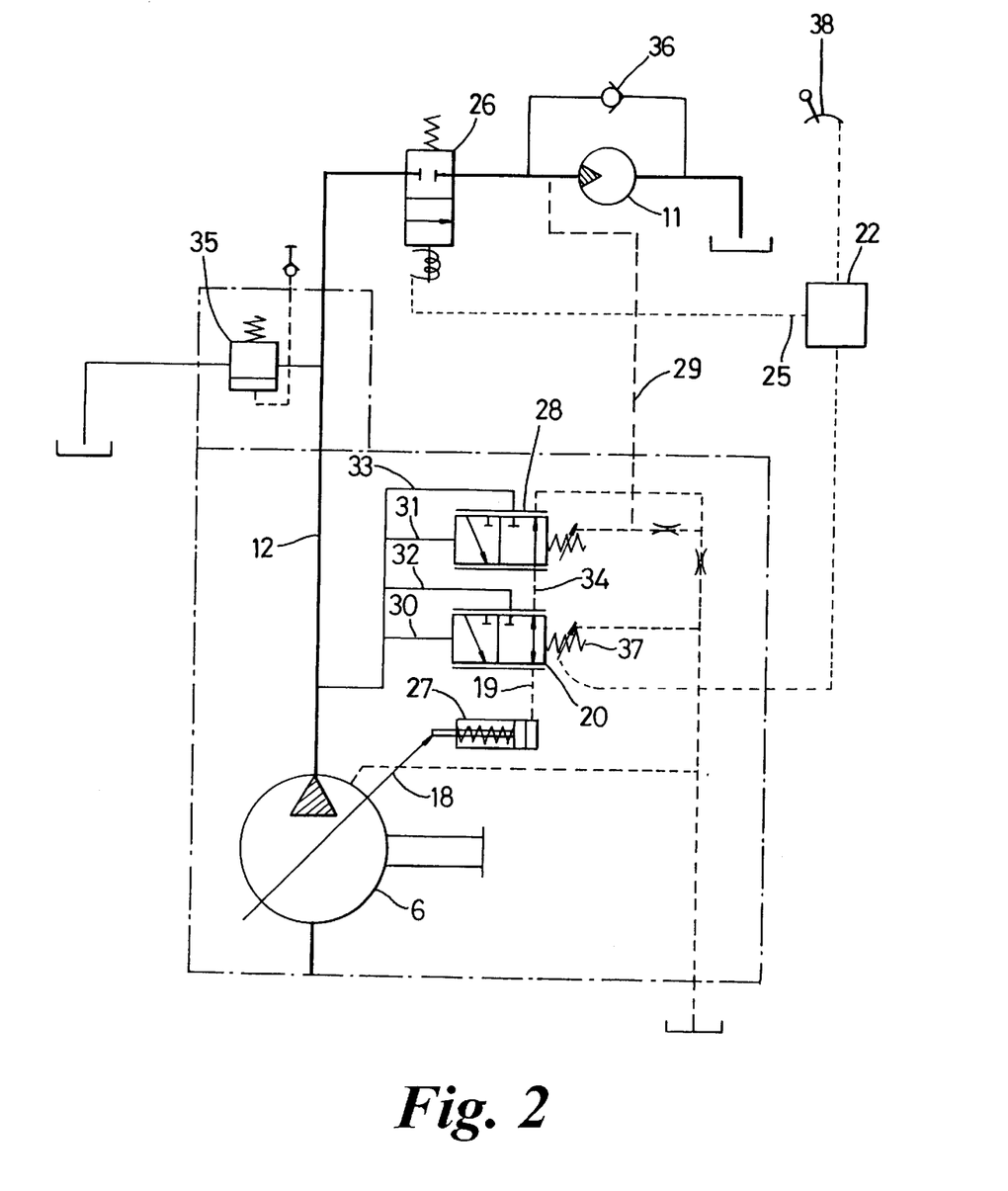
FIG. 2 is a diagram of the hydraulics of the front wheel speed change apparatus shown in FIG. 1.

The valves 20, 28 are of simple two position design spring biased to the left position as shown in FIG. 2. The pressure in the supply line 12 from the pump ("supply pressure") is applied to the left hand side (in FIG. 2) of the valve members of both valves 20, 28 via lines 30, 31 respectively. Branch lines 32, 33 from the supply line 12 also lead to the inlets of the valves 20, 28 respectively.

The on/off valve 26 is shown at the top of FIG. 2. As previously described, the valve 26 is situated in the supply line 12 from the pump 6 to the motor 11 and is actuated by an electronic signal from the control unit 22 to either open or shut off the supply to the motor 11. A line 29 leads from the motor side of the valve 26 down to the valve 28 and is arranged so that the pressure in the line 29 is applied to the right hand side (in FIG. 2) of the valve member of the valve 28.

The valve 28 in its left hand position, the position drawn in FIG. 2 into which it is biased, simply blocks the line 33 connecting the supply line 12 to the valve inlet. In its right hand position the line 33 is connected to a line 34 connecting the outlet of the valve 28 with the inlet of the valve 20, thereby supplying supply pressure to the valve 20 inlet.

The valve 20 in its left hand position (in FIG. 2) again blocks the line 32 carrying supply pressure, but allows pressure in the connecting line 34 to be supplied to the control cylinder 27 via the line 19. In its right hand position, the valve 20 supplies supply pressure to the control cylinder 27 via the line 19.

The valves 20, 28 are both spring biased into the left hand position as shown in FIG. 2. The strength of each of the springs may be varied, and the strength of the spring 37 in the valve 20 may be adjusted via the control unit 22 which has an input from a cab mounted control 38 for that purpose.

Lastly, a safety relief valve 35 is incorporated in the supply line 12 to ensure that the pump is not overloaded and a check valve 36 is connected in parallel with the motor 11 to prevent the motor working in reverse.

When the main on/off valve 26 is switched on, supply pressure is fed to the motor 11 and also applied via the line 29 to the right hand side of the valve member of the valve 28, biasing it towards the left (in FIG. 2). Supply pressure is also applied to the left hand side of the valve member, balancing the pressure on the right and leaving the force of the biasing spring as the only resultant force acting on the valve member. The member will thus move to the left (the position shown in FIG. 2), blocking off the supply pressure on the line 33. The control valve 28 thus has no function in this mode.

The control valve 20 has supply pressure on the line 30 acting to move its valve member to the right and a variable strength spring 37 biasing it to the left. If the supply pressure is weaker, the valve will be in the left hand position (in FIG. 2) and the line 32 carrying supply pressure to the inlet of the valve 20 will be blocked. There will thus be no pressure transmitted to the control cylinder 27 and the pump swashplate 18 will go to its fully open position, increasing the supply pressure and thus overcoming the spring in the valve 20 and moving it to the right. This connects the inlet of the valve 20, and thus the line 32 carrying supply pressure, to the line 19 and thus to the control cylinder 27, closing off the pump swashplate 18 and reducing the supply pressure. A loop is thus set up, with the supply pressure (in this mode "system pressure") set by the strength of the spring 37. The strength of the spring 37 may be varied by cab mounted control 38 to control the pressure to the motor 11 and thereby the maximum torque available.

When the valve 26 is closed, there will be substantially zero pressure on the line 29 and thus no pressure acting on the right hand side of the valve member of the valve 28. The spring in the valve 28 is relatively weak and its bias easily overcome by the supply pressure in the line 31 acting on the left hand side of the valve member when the pump 6 is in its default maximum displacement setting. The valve member will thus move to the right (in FIG. 2), causing supply pressure to be applied to the control cylinder which thus closes off the pump swashplate 18 thereby reducing the pump flow and hence the supply pressure. A loop is thus set up, with the strength of the spring in the valve 28 setting the supply pressure. This is a "standby" pressure setting with the pump doing virtually no work and just "ticking over" whilst the motor 11 is disconnected.

The spring in the other control valve 20 is stronger than the spring in the valve 28. When there is no pressure on the line 29, therefore, the valve 20 will always be in the left hand position as shown in FIG. 2 because the valve 28 will have set the supply pressure (acting on the left hand side of the valve 20) at a low "standby" level which is unable to overcome the bias of the spring 37 in the valve 20.

The level of the "standby pressure" can be set by varying the strength of the spring in the valve 28 as schematically shown in FIG. 2. In practice this will not be adjusted regularly, however.

As described, the control of the system pressure (and thus the torque capacity of the motor 11) is purely hydraulic and responds only to the setting of the cab mounted pressure control 38. However, the control cylinder 27 could alternatively be supplied from a variable valve whose setting is controlled electronically. In this case, the system pressure could be automatically controlled on the basis of a number of factors such as speed, engine revs., main transmission gear ratio, etc.

In normal operation of the tractor, ie driving in a straight line or making relatively gentle turns, the hydraulic motor 11 is idle and thus, whether four wheel drive is engaged or not, the front axle drive shaft 7 will be rotating faster than the sprag clutch 14 (which is not being driven) and the sprag clutch will therefore slip. When a steering angle of 15 degrees is exceeded, the electronic control unit 22 will detect this from the signals from the steering angle sensors 21. At this point the unit 22 will send a signal to the four wheel drive clutch actuator 24 to disengage the four wheel drive clutch 8 and a signal to the main solenoid valve 26 to open up flow to the motor 11. Drive from the main transmission is thus disconnected from the front axle drive shaft and the speed of rotation of the front axle drive shaft is then determined by ground speed or by the drive from the motor 11 as explained below.

It may alternatively be desirable to have the motor 11 energised at a larger steering angle than that at which four wheel drive is disengaged. The steering angle at which the hydraulic motor 11 is engaged may be in the range of 5 to 40 degrees, while the steering angle at which the four wheel drive is disengaged may be in the range of 5 to 40 degrees.

In its "no load" condition the hydraulic pump/motor will drive the sprag clutch at a given maximum speed. Provided the front axle drive shaft is being driven from the front wheels at a greater speed than the sprag clutch, the clutch will slip and no torque will be applied to the shaft. At slower ground speeds the sprag clutch will engage and torque will be applied to the shaft. In practice this means that the front axle will not be accelerated when cornering fast. This is generally desirable since there is no need for four wheel drive when cornering fast and it is safer not to have the hydraulic drive engaging at high speeds.

When the hydraulic motor is driving the front axle, it is possible that the wheels may slip and this is dependent on a number of factors—ground/tire properties, speed, angle of turn, etc. and also the torque applied by the hydraulic motor 11. In general it is desirable to avoid wheel slip and the position of the valve 20 can be adjusted accordingly using the cab mounted control 38 to adjust the supply pressure and thus the torque of the motor 11 for particular working conditions.

Given that wheel slip is avoided, the speed of the front wheels is determined entirely by the tractor speed and by the steering geometry. The "ratio" is thus infinitely variable, depending on the exact steering angle. This of course represents a dramatic improvement over "mechanical" bi speed facilities which take drive from the main transmission via conventional gearing. This type of arrangement generally offers only one ratio which will only be the correct ratio for avoiding wheel slip at one steering angle; at other angles the wheels will still slip.

As described above, the torque applied to the front wheels is infinitely variable by means of the control valve 20. It will be appreciated that, once the limiting position of the valve for avoiding wheel slip is found, the position of the valve may still be varied within that limit to control the torque applied to the front wheels and thus the general "aggressiveness" of the drive to the front wheels.

This arrangement also differs from a conventional bi speed in that the drive from the engine 1 to the hydrostatic pump/motor is direct and thus the range of ratios would need to be very large if the bi speed were to operate over the entire ground speed range of the tractor. For this reason the operation of the bi speed is restricted so that it only engages when the main transmission is in a certain range of ratios. In this example the transmission has 12 forward ratios selected by a three position "range" lever and a four position "gear" lever. The control unit 22 will only energise the motor 11 when "low" or "medium" range is engaged, corresponding to ratios 1 to 8 (a speed range of 0–12 kph).

The control unit 22 includes an input on line 40 from a sensor on the main clutch and disables the motor 11 when the clutch is disengaged. The unit 22 will also disable the motor 11 if the signal on line 39 from the main transmission ratio sensing means indicates that the main transmission is in neutral. These features ensure that the system is not energised when the tractor is stationary.

A possible variant of the system described above might be electronically to control the pump to provide front wheel speed of a given percentage of rear wheel speed, the percentage being variable with sensed steering angle. Another variant might be to use a fixed displacement pump driven direct from the rear wheel drive shaft.

The second embodiment will now be described with reference to FIGS. 3 to 6.

Figure 3:
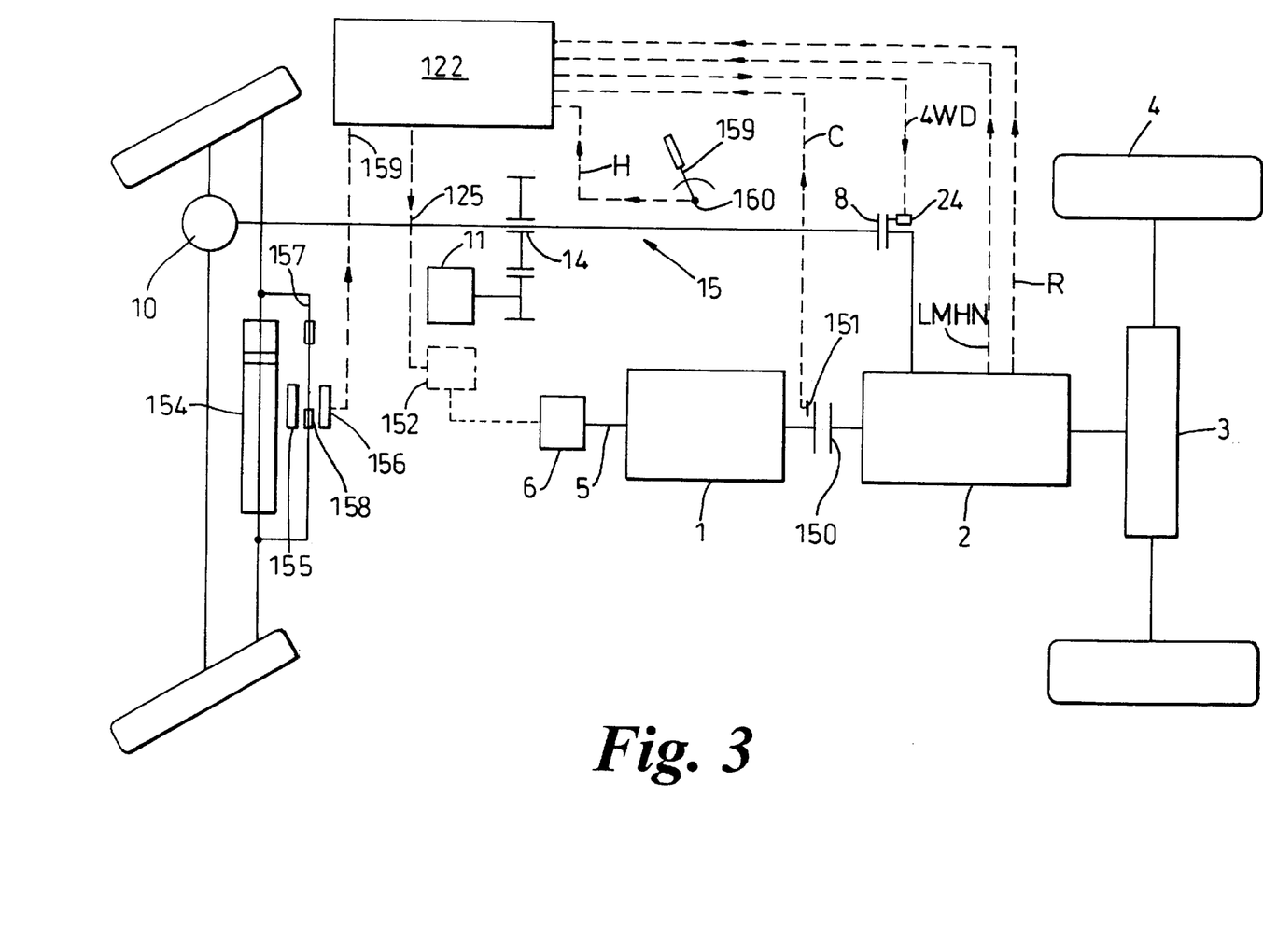
FIG. 3 is a general schematic view of the driveline of a tractor incorporating front wheel speed change apparatus in accordance with the invention (second embodiment)

Referring to FIG. 3, the basic layout of the tractor driveline remains essentially unchanged. Similar parts are numbered as for the first embodiment.

In the second embodiment, the steering angle is sensed in a different way, based on the displacement of the steering cylinder 154. A rod 157 of stainless steel or other non-magnetic material is fixed to each end of the piston of the steering cylinder, so that it moves with it. Mounted on or incorporated in the rod 157 are two magnets 158. On one side of the rod 157 is a reed switch 156 and, opposite the reed switch on the other side of the rod 157 is a piece of ferrous material 155. The magnets 158 on the rod 157 are so positioned that one or other of them will pass between the reed switch and the piece of ferrous material 155 when a given steering angle is reached, thereby causing the reed switch to close (or open) and send a signal to the control unit 122. The magnets 158 are movably mounted on the rod 157 to allow for adjustment of the steering angle at which the hydraulic drive cuts in. It will be appreciated that additional magnets could be provided to give eg a second signal at a second steering angle if necessary. One possibility would be to use different strength magnets and two or more reed switches which require different strengths of magnetic field to activate them.

In FIG. 3, the hydraulic control between the pump 6 and motor 11 is shown schematically as box 152 with control line 125 extending between it and the electronic control unit 122. Line 125 in fact represents a number of control lines to solenoid valves within the hydraulic system 152, and these will be explained below with reference to FIGS. 4 to 6. FIG. 3 shows the main clutch 150, with an associated sensor 151 connected to the control unit 122 via a clutch status line C. The four-wheel drive clutch actuator 24 is connected to the control unit 122 via a four-wheel drive control line 4WD. A signal indicating whether the transmission is in low, medium or high range or neutral is carried on line LMHN from a sensor in the transmission to the control unit 122, whilst a signal indicative of whether the transmission is in forward or reverse is carried on line R from another sensor in the transmission to the control unit 122. A handbrake 159 is provided with a handbrake status sensor 160 and a handbrake status signal line H extends from the sensor to the control unit 122.

Figure 4:
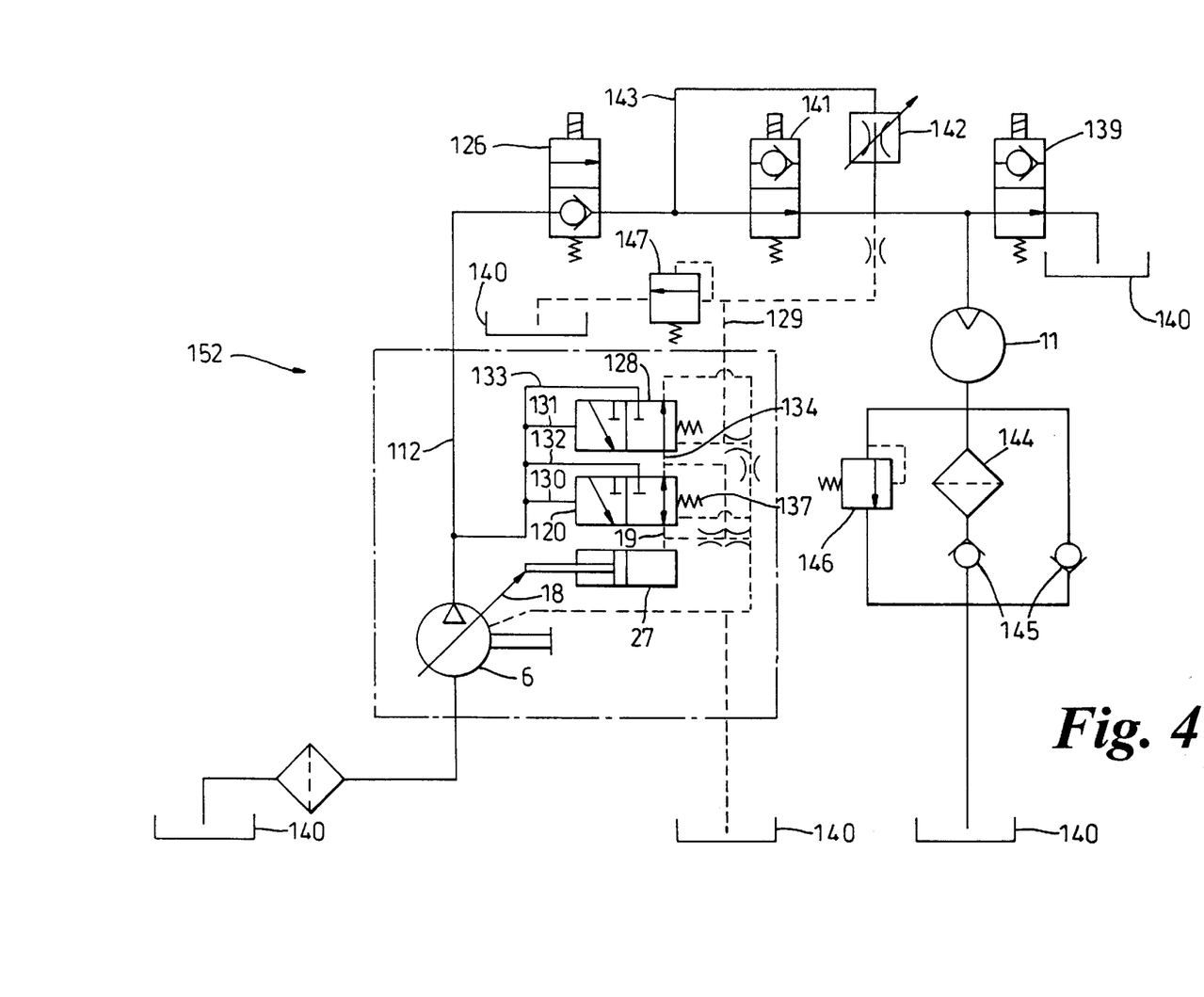
FIG. 4 is a schematic diagram of the hydraulics of the front wheel speed change apparatus shown in FIG. 3.

Referring now to FIG. 4, the hydraulic system 152 (together with pump 6 and motor 11) is similar in many respects to that of the first embodiment. The swashplate 18 of the variable displacement pump 6 is controlled, as in the first embodiment, by a "spring on pressure off" control cylinder 27. The hydraulic supply line 19 to the control cylinder is connected to a valve 120, similar in most respects to the equivalent valve 20 in the first embodiment, other than that the biasing spring 137, whilst still being adjustable, is not used to adjust routinely the system pressure and thus the torque provided by motor 11.

As with the first embodiment, a line 134 extends between valve 120 and valve 128, the equivalent of valve 28 in the first embodiment. Valve 128 is similar to valve 28 in the first embodiment—the biasing spring is adjustable, but this is only used to adjust the "stand-by" pressure, usually on a one-off basis. Unlike the first embodiment, this valve is involved in setting the pressure or volume of flow to the motor, as will be explained below. Lines 130, 131, 132 and 133, as with the first embodiment, are branch lines from the main line 112 from the pump to the motor 11.

As with the first embodiment a line 129 provides a supply of control pressure to the control input of valve 128 and, as with the first embodiment, the line 129 extends from line 112 between an on/off solenoid valve 126 (equivalent to valve 26 in the first embodiment) and the motor 11. However, in this embodiment an additional valve 139 is incorporated on a branch leading from the motor supply 112 to the tank 140 (zero pressure). This valve 139 is arranged to be open when valve 126 is closed and vice versa, and its function is to prevent the operation by motor 11 as a pump when the transmission is operating in reverse by providing a line directly from the motor 11 to the tank 140 when the hydrostatic drive to the front axle is switched off.

In a major change from the first embodiment a shunt line 143 to the hydraulic supply line 112 is provided, incorporating a variable restriction 142. The shunt line 143 extends around a further solenoid valve 141 in the main supply line 112. The purpose of this arrangement is to provide a system setting with a reduced maximum flow rate to the motor 11, and thus reduced maximum speed of the motor.

When valve 141 is open, the system operates substantially as previously described in relation to the first embodiment. When the valve 141 is closed, the flow to the motor 11 is forced to pass through the restriction 142. The restriction will allow fluid to pass through it at up to a given rate before it substantially affects the flow. At the critical flow rate, a pressure drop will begin to develop across the restriction 142. This pressure drop across the restriction 142 results in a lowering of the pressure on control pressure line 129 with respect to the pressure at the pump outlet, which means that there will be the same pressure drop across the control ports of the valve 128.

Once the pressure drop across valve 128 exceeds the valve spring pressure, the valve member will move to the right (in FIG. 2) and supply pump outlet pressure to the control cylinder via valve 120 and lines 34 and 19, which will in turn cause the swashplate to close off and reduce the flow rate to the motor via the restriction 142. The reduction in flow rate from the pump will, in turn, reduce or eliminate the pressure drop across the restriction 142 resulting in the pressure on each side of valve 128 equalising.

A control loop is thus set up, with the steady state flow rate to the motor 11 being set by the strength of the valve spring in valve 128 together with the dimensions of the restriction 142. The diameter of the restriction 142 is in fact variable, but it is not intended that regular adjustment be made. The reasons for this being desirable will be explained later.

The restriction 142 is adjustable and the reduction in maximum motor speed when the valve 141 is closed can therefore be set at will, although it is not a cab control and in practice will only be set once.

In this embodiment, the valve spring 137 of valve 120, although adjustable, is not intended to be adjusted regularly as in the first embodiment. Instead the maximum pressure to the motor 11 (and thus torque provided by the motor) may be set by adjusting a limiting valve 147 connected to the control pressure line 129 and to the tank 140. The valve 147 is controlled from the tractor cab to provide the operator with adjustable maximum torque to the front wheels when the hydrostatic drive is engaged.

A filter is provided between the motor 11 and the tank 140 to filter out particulates in the hydraulic fluid, and a system of branch lines and one-way valves 145 is provided to prevent the motor "sucking back" collected particulates when the main transmission is in reverse and the motor 11 is tending to operate as a pump. A filter overload valve 146 is provided in a branch line around the filter to prevent overload of the filter when the hydraulic fluid is cold or if the filter becomes blocked.

Figure 5:
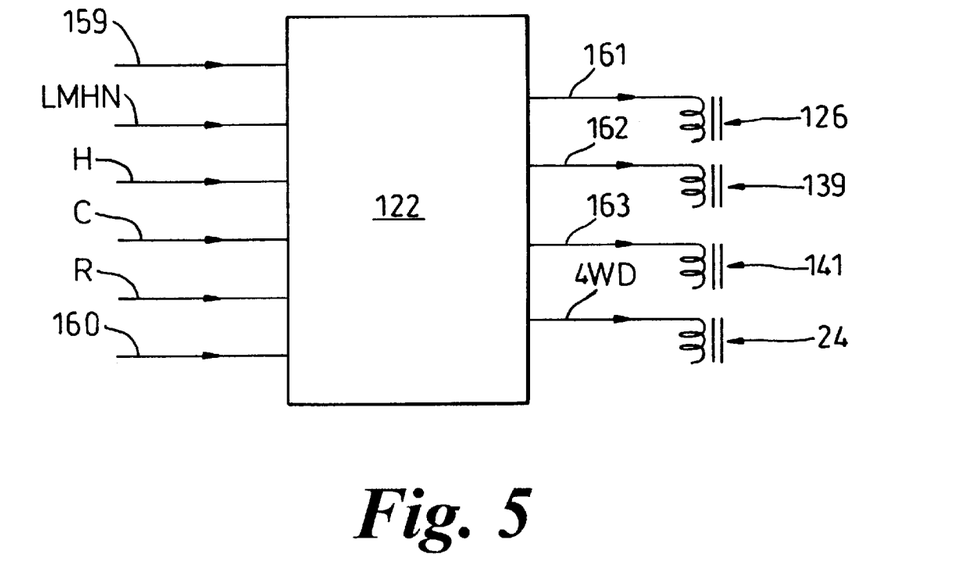
FIG. 5 is a schematic diagram of the electronic control system for the front wheel speed change apparatus shown in FIG. 3.

Turning now to FIG. 5, the electronic control unit 122 is shown schematically with inputs on the left and outputs on the right. The inputs are: input 159 from the steering angle sensor, input LMHN from the transmission range/neutral sensor, input H from the handbrake status sensor, input C from the clutch status sensor, input R from the forward/reverse transmission status sensor and input 160 from the cab mounted on/off switch for the system. The outputs are: line 161 to a solenoid controlling valve 126 (see FIG. 4), line 162 to a solenoid controlling valve 139 (see FIG. 4), line 163 to a solenoid controlling valve 141 (see FIG. 4) and output 4WD to a solenoid controlling the four-wheel drive clutch actuator 24 (see FIG. 3).

The hydrostatic front wheel speed change apparatus will be disabled, that is to say, the outputs to valve 126 will be such as to the close the valve, the output to valve 139 will be such as to open the valve and the output to valve 141 will be such as to open it, in the following circumstances:
 (a) if the input on line 159 indicates that a required steering angle has not been reached;
 (b) or if the input on line 60 indicates that the system is switched off;
 (c) if the input on line R indicates that the main transmission is in reverse;
 (d) if the input on line C indicates that the vehicle main clutch is disengaged;
 (e) if the input on line H indicates that the handbrake has been put on; or
 (f) if the input on line LMHN indicates either that the main transmission is in high range (ratios 9 to 12) or is in neutral.

In any of these cases, the output on line 4WD to the four-wheel drive clutch actuator 24 will be such that the four-wheel drive is not required to be disengaged, and the status of the four-wheel drive may be determined by other systems in the vehicle.

If the signal on line 160 indicates that the system is "switched on", if the signal on line 159 indicates that the steering angle is above a certain value and if the signals on lines H, C, R and LMHN are not such as to prohibit activation of the system as described above, then the outputs from the control unit 122 will be according to either of the following conditions:
 (a) Signal on line LMHN indicates that the main transmission is in medium range (gear ratios 5 to 8):
  (i) output on line 161 to the solenoid of valve 126 will be such as to open the valve;
  (ii) output on line 162 to the solenoid of valve 139 will be such as to close the valve; and
  (iii) output on line 163 to the solenoid of valve 141 will be such as to open the valve.
  In this event, referring to FIG. 4, the volume flow available to the motor will be limited essentially only by the capacity of the pump 6.
 (b) Signal on line LMHN indicates that the main transmission is in low range (ie ratios 1 to 4):
  (i) output on line 161 to the solenoid of valve 126 will be such as to open the valve;
  (ii) output on line 162 to the solenoid of valve 139 will be such as to close the valve; and
  (iii) output on line 163 to the solenoid of valve 141 will be such as to close the valve 141.
  In this event, referring to FIG. 4, the flow of hydraulic fluid to the motor 11 will be forced through the restriction 142 and will be reduced as explained above, ie the maximum flow rate of hydraulic fluid to the motor 11 will be determined both by the strength of the valve spring of valve 128 and the pressure drop across the restriction 142. The result will be to lower the maximum speed of the motor 11.

In both of the above cases, the signal to the four-wheel drive clutch actuator 24 on line 4WD will be such as to disengage the four-wheel drive. In either of the above cases, the pressure of the supply to the motor 11 and therefore the torque provided by the motor 11 may be set by adjustment of valve 147.

The reasoning for the two operating modes described above will now be explained with reference to FIG. 6, which is a plot of "overdrive ratio" against engine revs, "overdrive ratio" being the ratio between the speed of the rear wheels of the tractor and the maximum possible front wheel speed attainable by the hydraulic drive.

Because the hydraulic pump 6 is driven directly from the tractor engine, the speed of the pump 6 will be directly proportional to engine revs and the maximum flow rate from the pump 6 will be directly proportional to engine revs. In the absence of any flow restriction, therefore, the maximum flow rate to the motor 11 will be directly proportional to engine revs. This can result in a very high "overdrive ratio" when engine revs are high and the main transmission gear ratio is low, which can lead to excessive wheel spin at the front wheels.

The solution to this problem is the incorporation of the flow restriction 142 and valve 141. At higher gear ratios (ratios 5 to 8, constituting "medium range"), when there is little risk of excessive wheel spin the valve 141 is open and there is no restriction on flow rate to the motor 11. In "low range" (ratios 1 to 4), when there would be a risk of excessive wheel spin, the valve 141 is closed causing the maximum motor speed to be reduced.

Figure 6:
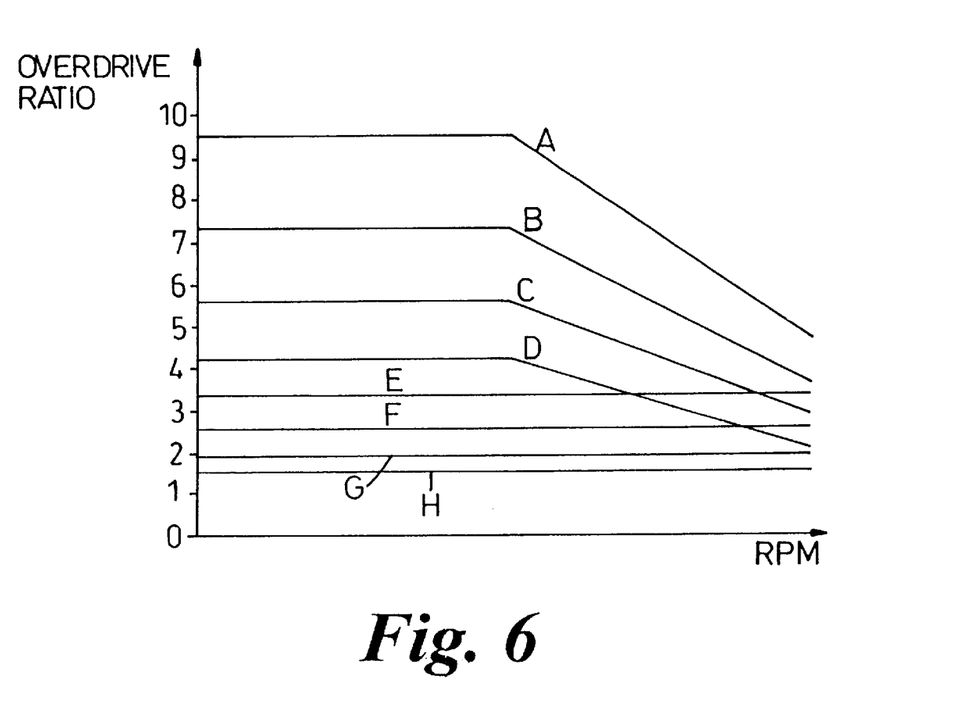
FIG. 6 is a plot of engine speed against the ratio of maximum front wheel speed to rear wheel speed for the apparatus shown in FIG. 3.

Referring now to FIG. 6, a line is plotted for each of the eight main transmission ratios in which the hydraulic front wheel drive may be engaged, line A representing ratio 1 (lowest), line B ratio 2, etc up to line H representing ratio 8. Lines E to H, representing the four higher ratios of "medium range", are horizontal lines: the overdrive ratio is constant since both the rear wheel speed and the maximum front wheel speed are directly proportional to engine speed. Lines A to D, representing "low range" are horizontal up to a given value for engine revs, and from there follow a straight line with negative gradient representing a decrease in overdrive ratio as engine revs increase.

The turning point in the top four lines corresponds to the pump speed which causes critical flow through the restriction 142, ie the flow at which a pressure drop starts to be created across the restriction. At this flow rate, a pressure drop will be created across the valve 128 as explained above, which has the effect of limiting the flow rate to the motor 11 by adjusting the angle of the pump swashplate even though the pump continues to rotate at the speed dictated by the speed of the engine. As the engine speed increases along the x axis in FIG. 6, the pressure drop across the restriction 142 and across the valve 128 will increase further and thus further reduce the swashplate angle.

The horizontal portions of lines A to D represent lower engine revs which do not fall in the normal working range of the engine, and therefore potential wheel spin is not a problem.

It will be appreciated that this curbing of flow to the motor 11 at high revs in low gear would not be so necessary if the pump 6 were driven from the main transmission (as shown in FIG. 7) or from the rear axle (as shown in FIG. 8), rather than directly from the engine 1. However, driving the pump from the engine is a simpler and less expensive arrangement and has been found to work satisfactorily in combination with the flow limiting system described above.

What is claimed is:

1. A driveline system for a vehicle comprising:
a first axle including a wheel;
a second axle including a wheel;
an engine;
a mechanical main transmission connected to said engine for rotatably driving said wheel of said first axle and for selectively rotatably driving said wheel of said second axle;
a hydraulic motor; and
means for automatically connecting said hydraulic motor to rotatably drive said wheel of said second axle when a steering angle of said wheel of said second axle exceeds a first predetermined value.

2. The front wheel speed change apparatus defined in claim 1 wherein the main transmission is a mechanical four wheel drive transmission.

3. The front wheel speed change apparatus defined in claim 1 further including means for disengaging drive to the front wheels from the main transmission when the steering angle of the front wheels exceeds a second predetermined value.

4. The front wheel speed change apparatus defined in claim 1 wherein the drive from the hydraulic motor to the front wheels is provided by a one-way clutch.

5. The front wheel speed change apparatus defined in claim 1 wherein a torque is applied to the front wheels by the hydraulic motor, the apparatus including means for selectively controlling the torque applied by the hydraulic motor to the front wheels.

6. The front wheel speed change apparatus defined in claim 1, including means for selectively controlling the speed at which the front wheels are driven by the hydraulic motor.

7. The front wheel speed change apparatus defined in claim 1, wherein said means for engaging drive from the hydraulic motor includes means for detecting a current ratio of the vehicle main transmission and engaging drive only when the ratio detected is a certain ratio.

8. The front wheel speed change apparatus defined in claim 1 wherein said means for engaging drive from the hydraulic motor includes means for detecting a current ratio range of the vehicle main transmission and engaging drive only when the ratio range detected is a certain ratio range.

9. The front wheel speed change apparatus defined in claim 1 including a vehicle main clutch, wherein said means for engaging drive from the hydraulic motor includes means for detecting a status of the vehicle main clutch and not engaging hydraulic drive when the vehicle main clutch is disengaged.

10. The front wheel speed change apparatus defined in claim 1 including means for detecting certain ratios of the vehicle main transmission and for automatically limiting a maximum speed of the hydraulic motor in dependence on the detection of the said certain ratios.

11. The front wheel speed change apparatus defined in claim 1 including means for detecting certain ratio ranges of the vehicle main transmission and for automatically limiting a maximum speed of the hydraulic motor in dependence on the detection of the certain ratio ranges.

12. The front wheel speed change apparatus defined in claim 1 wherein the said first predetermined value of the steering angle is in the range of 5 to 40 degrees.

13. The front wheel speed change apparatus defined in claim 1 wherein the said first predetermined value of the steering angle is in the range of 5 to 30 degrees.

14. The front wheel speed change apparatus defined in claim 1 wherein the said first predetermined value of the steering angle is in the range of 20 to 25 degrees.

15. The front wheel speed change apparatus defined in claim 3 wherein the said second predetermined value of the steering angle is in the range of 5 to 40 degrees.

16. The front wheel speed change apparatus defined in claim 3 wherein the said second predetermined value of the steering angle is in the range of 15 to 30 degrees.

17. The front wheel speed change apparatus defined in claim 3 wherein the said second predetermined value of the steering angle is in the range of 20 to 25 degrees.

18. The front wheel speed change apparatus defined in claim 1 wherein the hydraulic motor is supplied by a hydraulic pump driven directly from the main transmission.

19. The front wheel speed change apparatus defined in claim 1 wherein the vehicle includes an engine and the hydraulic motor is supplied by a hydraulic pump driven directly from the engine of the vehicle.

20. The front wheel speed change apparatus defined in claim 1 wherein vehicle includes a rear axle and the hydraulic motor is supplied by a hydraulic pump driven directly from the rear axle of the vehicle.

* * * * *